: US009272240B2

(12) United States Patent
Schedler et al.

(10) Patent No.: US 9,272,240 B2
(45) Date of Patent: Mar. 1, 2016

(54) METHOD AND DEVICE FOR PURIFYING EXHAUST GASES

(75) Inventors: Johannes Schedler, Wildon (AT); Heimo Thalhammer, Graz (AT); Gerhard Philipp, Pottschach (AT)

(73) Assignee: Chemisch Thermische Prozesstechnik GmbH, Graz (AT)

( * ) Notice: Subject to any disclaimer, the term of this patent is extended or adjusted under 35 U.S.C. 154(b) by 0 days.

(21) Appl. No.: 13/512,063

(22) PCT Filed: Nov. 16, 2010

(86) PCT No.: PCT/EP2010/006977
§ 371 (c)(1),
(2), (4) Date: Aug. 22, 2012

(87) PCT Pub. No.: WO2011/063905
PCT Pub. Date: Jun. 3, 2011

(65) Prior Publication Data
US 2012/0315205 A1 Dec. 13, 2012

(30) Foreign Application Priority Data
Nov. 26, 2009 (DE) .......................... 10 2009 055 942

(51) Int. Cl.
*B01D 53/56* (2006.01)
*B01D 53/00* (2006.01)
*B01D 53/34* (2006.01)
*B01D 53/72* (2006.01)
(Continued)

(52) U.S. Cl.
CPC .............. *B01D 53/56* (2013.01); *B01D 53/005* (2013.01); *B01D 53/343* (2013.01); *B01D 53/72* (2013.01); *C04B 7/364* (2013.01); *F23G 7/068* (2013.01); *F27B 7/2033* (2013.01); *F27D 17/008* (2013.01); *B01D 2251/2062* (2013.01); *B01D 2251/2067* (2013.01); *B01D 2257/502* (2013.01); *B01D 2259/12* (2013.01)

(58) Field of Classification Search
None
See application file for complete search history.

(56) References Cited

U.S. PATENT DOCUMENTS 2,522,639 A * 9/1950 Royster ........................... 432/17
3,870,474 A 3/1975 Houston
(Continued)

FOREIGN PATENT DOCUMENTS

CA 2527706 1/2005
DE 4432316 A1 3/1996
(Continued)

OTHER PUBLICATIONS

Gerald L. Young, NOx Formation in Rotary Kilns Producing Cement Clinker Applicable NOx Control Techniques and Cost Effectiveness of These Control Techniques, Penta Engineering Corporation, 2002, pp. 239-254.*

(Continued)

*Primary Examiner* — Jennifer A Smith
*Assistant Examiner* — Anita Nassiri Motlagh
(74) *Attorney, Agent, or Firm* — Thompson Coburn LLP

(57) ABSTRACT

The invention relates to a regenerative thermal postcombustion plant (24) used for purifying exhaust gas comprising hydrocarbons and nitrogen oxides, particularly for exhaust gas occurring during cement clinker production, by means of which the carbon compound is oxidized and the nitrogen oxides are thermally reduced while feeding in a nitrogen-hydrogen compound at a temperature of greater than 800° C. in the multistage combustion chamber (35).

16 Claims, 2 Drawing Sheets

Figure 1:
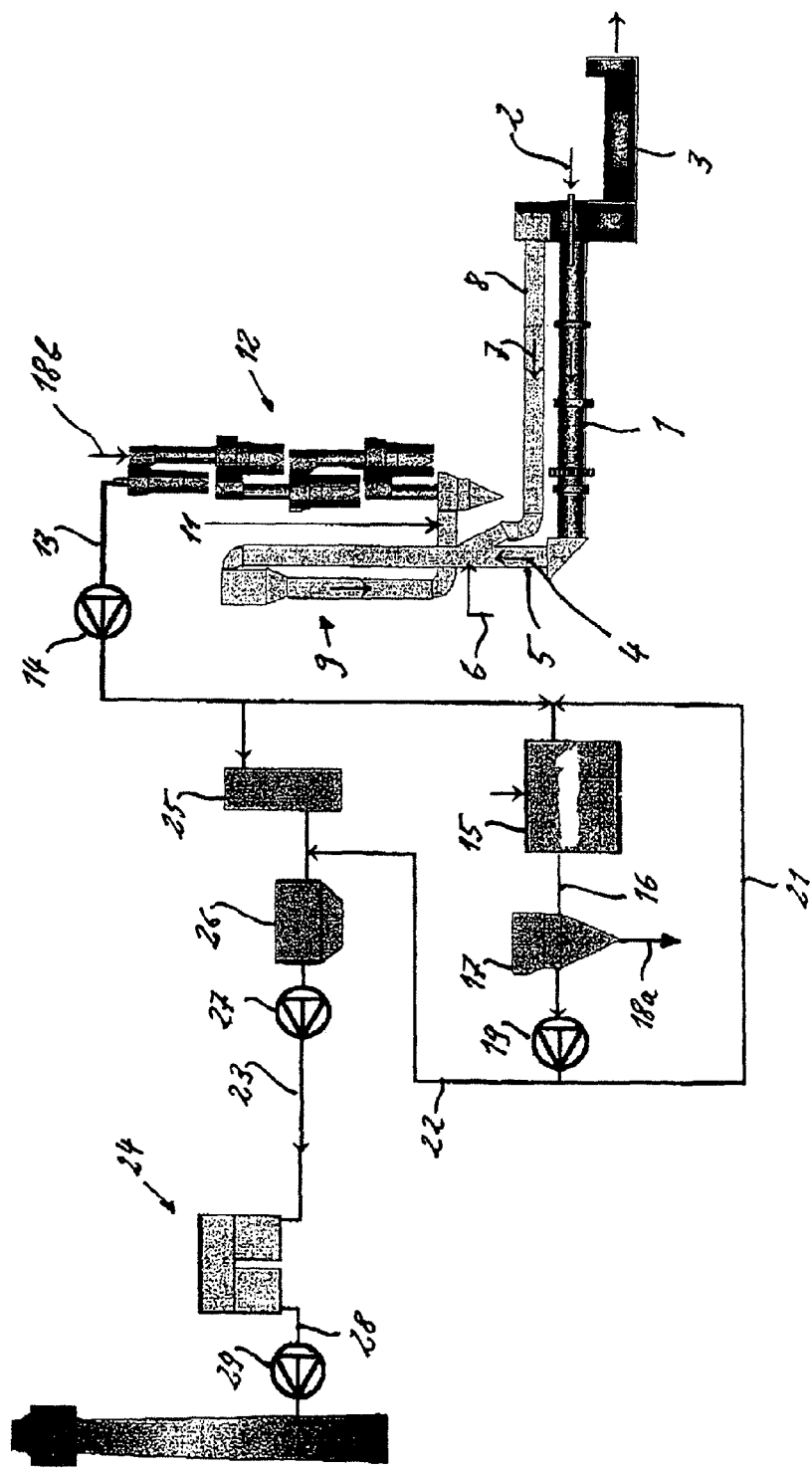

(51) Int. Cl.
  *C04B 7/36* (2006.01)
  *F23G 7/06* (2006.01)
  *F27B 7/20* (2006.01)
  *F27D 17/00* (2006.01)

(56) References Cited

U.S. PATENT DOCUMENTS

| | | | |
|---|---|---|---|
| 5,026,277 A | | 6/1991 | York |
| 5,364,259 A | * | 11/1994 | Matros et al. ............... 431/5 |
| 5,478,542 A | * | 12/1995 | Chawla et al. ............. 423/235 |
| 5,589,142 A | | 12/1996 | Gribbon |
| 5,632,616 A | * | 5/1997 | Tutt et al. ............... 432/105 |
| 5,935,525 A | * | 8/1999 | Lincoln et al. ............ 422/121 |
| 6,183,707 B1 | * | 2/2001 | Gosselin et al. ........... 423/210 |
| 7,553,155 B2 | * | 6/2009 | Erpelding et al. ............ 432/58 |
| 7,682,586 B2 | | 3/2010 | Harold et al. |
| 2003/0211024 A1 | * | 11/2003 | Wojichowski ............. 423/235 |
| 2008/0050297 A1 | * | 2/2008 | Harold et al. ........... 423/239.1 |

FOREIGN PATENT DOCUMENTS

| | | |
|---|---|---|
| DE | 19600869 | 7/1997 |
| DE | 19619919 | 8/1997 |
| DE | 10214567 C1 | 9/2003 |
| DE | 10316784 | 10/2004 |
| EP | 0440181 | 8/1991 |
| EP | 0472605 A1 | 3/1992 |
| EP | 0577881 | 1/1994 |
| EP | 0583771 | 2/1994 |
| EP | 0588079 | 3/1994 |
| EP | 1350552 | 10/2003 |
| EP | 1842836 A1 | 10/2007 |
| GB | 2044900 A | 10/1980 |
| WO | 90/12248 A1 | 10/1990 |
| WO | 2005/108891 A1 | 11/2005 |

OTHER PUBLICATIONS

2003 EPA Air Pollution Control Technology Fact Sheet (EPA-452/F-03-022).*
Chang Mo Nam, "NOx reduction by SNCR and its reaction mechanism under oxidizing diesel flue gas conditions", Environ. Eng. Res. vol. 8, No. 1, pp. 31-40, 2003.*
Smoot et al., "NOx Control Through Reburning", Prog. Energy Combust. Sci. vol. 24, pp. 385-408, 1998.*
International Search Report for PCT/EP2011/006977 dated Mar. 9, 2011.
Rühle, W.: Rauchgasreinigung nach Verbrennungsverfahren; Haus der Technik-Vortragsveröffentlichungen Nr. 518; Vulkan-Verlag Dr. W. Classen Nachf. GmbH & Co. KG, in: Essen; p. 69, 77; published prior to the filing date of the subject application.
CUTEC-Institut GmbH: Bildung und Minderung von Stickoxiden aus Brennstoff-Stickstoff-Verbindungen in thermischen Abgasreinigungsanlagen mit regenerativer Abluftvorwärmung, Schlussbericht Forschungsvorhaben AiF-Vorhaben—Nr. 14084 (7/04 bis 12/07) Apr. 28, 2008; published prior to the filing date of the subject application.
Bildung und Minderung von Stickoxiden aus Brennstoff-Stickstoff-Verbindungen in thermischen Abgasreinigungsanlagen mit regenerativer Abluftvorwärmung; VDI-Bericht 2035: Emissionsminderung 2008; Nürnberg, VDI Verlag GmbH: in: Düsseldorf; 2008; ISBN 978-3-18-092035-1, p. 89 to 106; published prior to the filing date of the subject application.

\* cited by examiner

METHOD AND DEVICE FOR PURIFYING EXHAUST GASES

CROSS-REFERENCE TO RELATED APPLICATIONS

This application is a National Stage application of International Patent Application No. PCT/EP2010/006977, filed on Nov. 16, 2010 and incorporated by reference herein in its entirety, which claims the benefit of German Patent Application No. 10 2009 055 942.6, filed Nov. 26, 2009 and incorporated by reference herein in its entirety.

The invention relates to a method according to the preamble of claim 1. The invention further relates to a device for performing the method.

A method according to the preamble of claim 1 is known from U.S. Pat. No. 5,589,142. The heat storage bodies of the regenerators are thereby provided with a catalyst layer for combusting volatile organic compounds. The combustion chamber having the burner is bounded by two catalyst layers for selectively catalytically reducing nitrogen oxides, wherein the nitrogen-hydrogen compound is fed into the exhaust gas upstream of the catalyst layer on the heat storage bodies of each regenerator and downstream of the combustion chamber catalyst layer facing said regenerator.

For cement production, but also for other industrial processes where fuels are burned in order to generate high temperatures, environmental aspects and the costs for raw materials and fuels play an increasingly significant role. Particularly the discharge of nitrogen oxides ($NO_x$), but also of carbon monoxide (CO), is to be reduced, while fuel costs are to be reduced by reducing the quantity of fuel and by using the most cost-effective fuels, so-called secondary fuels. Secondary raw materials, as well, such as fly ash, comprise organic components and thus promote the emission of carbon monoxide.

The use of an SNCR (Selective Non Catalytic Reduction) system for breaking down the nitrogen oxides in the exhaust gas is indeed known. However, only part of the NO can thus be broken down, and there is a risk, if the dosage of the ammoniac ($HN_3$) used as a reducing agent is too high, that an ammoniac slip will occur and thus hazardous ammoniac will be released to the atmosphere.

The object of the invention is to provide exhaust purifying, particularly for the cement industry, by means of which the discharge of pollutants is reduced while reducing fuel costs.

According to the invention, the exhaust gas is purified of nitrogen oxides ($NO_x$) and combustible carbon compounds. The carbon compound can thereby be carbon monoxide or an organic carbon compound, for example.

The exhaust gas is thereby fed through at least two regenerators connected by a combustion chamber and filled with heat storage bodies. Prismatically shaped ceramic heat storage bodies having a plurality of channels parallel to the main prismatic axis are preferably used as heat storage bodies, as is described in EP-B2-0472605.

The exhaust gas is fed to at least one regenerator in alternating cycles, the heat storage bodies thereof being heated in advance. The exhaust gas thus preheated is fed into the combustion chamber, comprising a high temperature of greater than 800° C., particularly 850 to 1000° C. At said high temperatures, the carbon compounds are combusted by the oxygen in the air in the combustion chamber, while the nitrogen oxides are reduced by means of a nitrogen-hydrogen compound in the combustion chamber at said high temperature.

The pure gas formed is then drawn off through at least one further regenerator, heating the heat storage bodies thereof, wherein the exhaust gas is cooled off again.

At least one further regenerator is preferably provided, and is purged with pure gas during the cycle. In place of two or three regenerators, for example, a plurality of regenerators can also be provided.

According to the invention, oxidation of the carbon compounds and reduction of the nitrogen oxides in the exhaust takes place exclusively thermally, that is, without the use of a catalyst. That is, according to the invention, a regenerative thermal postcombustion plant is used, by means of which NO is simultaneously reduced to nitrogen ($N_2$). According to the invention, exhaust gases comprising nitrogen oxides and carbon compounds and comprising catalyst poisons can also be purified.

While the carbon monoxide is largely oxidized to carbon dioxide in the combustion chamber, a lesser part of the nitrogen oxides is already reduced to nitrogen by the carbon monoxide, according to the invention. Nitrogen is further formed by the reduction of the nitrogen oxides by means of the nitrogen-hydrogen compound. Ammoniac, urea, or carbaminic acid is preferably used as the nitrogen-hydrogen compound.

The nitrogen-hydrogen compound for reducing the nitrogen oxides can be fed into the combustion chamber of the regenerative thermal postcombustion plant or partially carried with the exhaust gas.

The nitrogen-hydrogen compound is preferably fed into the combustion chamber as an aqueous solution. The solution can thereby comprise additives for lowering the required reaction temperature, for example organic compounds, such as alcohols. In order to optimally distribute the aqueous solution of the nitrogen-hydrogen compound in the combustion chamber, two-component jets, that is, a jet having a center opening for the aqueous solution and a concentric opening for the pressurized gas, or ultrasonic atomizers each having a constant or preferably pulsating pump pressure, can be sued.

The combustion chamber preferably comprises three zones, namely a first zone above the heat storage bodies of the regenerator, in which the CO, $NO_x$, and nitrogen-hydrogen compound (($NH_3$) components present in the exhaust gas initially react, a second zone between the two regenerators, and a third zone above the heat storage bodies of the regenerator through which the pure gas is drawn off. The nitrogen-hydrogen compound or the remaining part of the nitrogen-hydrogen compound is thereby fed in at the beginning and/or at the end of the second zone as an aqueous solution.

The nitrogen-hydrogen compound is fed into the preferred zone of the combustion chamber via injection lances distributed about the cross section of the combustion chamber.

If the exhaust gas already comprises part of the nitrogen-hydrogen compound, then part of the nitrogen oxides is reduced in the first zone. On the other hand, the nitrogen oxides are reduced in the second zone by means of the nitrogen-hydrogen compound fed in at the beginning of the second zone.

In order to increase the efficiency of the reduction of the nitrogen oxides, the aqueous solution of the nitrogen-hydrogen compound is preferably fed in both at the beginning of the second zone and at the end of the second zone, wherein the quantity of the nitrogen-hydrogen compound fed in at the beginning of the second zone is preferably greater than the quantity of nitrogen-hydrogen compound fed in at the end of the second zone. The quantities of the nitrogen-hydrogen compound fed in at the beginning and at the end of the second zone can thereby be controlled independently of each other.

The dwell time of the exhaust gas in the first zone and in the third zone of the combustion chamber is preferably 0.3 to 1 second each, particularly 0.4 to 0.6 seconds, and the dwell time of the exhaust gas in the second zone of the combustion chamber is preferably 0.5 to 2 seconds, particularly 0.8 to 1.5 seconds. A cycle preferably lasts 1 to 4, particularly 2 to 3 minutes.

The method according to the invention is particularly suitable for exhaust gases comprising nitrogen oxides and having a high content of organic and/or inorganic carbon compounds, such as a carbon monoxide of greater than 0.1% by volume, particularly greater than 0.4% by volume. The combustion enthalpy of the carbon compound can ensure autothermal operation of the postcombustion plant. That is, no further additional fuel is required for operating the postcombustion plant. The burner optionally provided in the combustion chamber therefore serves only for starting the postcombustion plant.

The exhaust gas purifying according to the invention can thus be used for industrial processes using fuels and/or raw materials that could previously not be used due to odor and CO formation.

The exhaust gas purifying according to the invention is therefore particularly suitable for exhaust gases from industrial processes where nitrogen oxides are formed due to high process temperatures in the presence of air, and carbon compounds such as carbon monoxide and organic compounds are also formed. This is, for example, also the case when burning lime, as well as in the steel industry, for example.

Above all, however, exhaust gas produced in cement clinker production is included.

The raw materials, such as limestone, quartz sand, and clay, are thereby ground together and simultaneously dried. The raw mix thus produced is then combusted in a rotary kiln at a temperature of about 1450° C. to form clinker, which is cooled down in a cooler by the inlet air of the kiln. Due to the high temperature in the rotary kiln, the exhaust gas exiting the rotary kiln has a high $NO_x$ concentration of greater than 1000 mg/m$^3$.

A primary firing is provided for operating the rotary kiln, by means of which the fuel and the combustion air, namely the primary air and the secondary air preheated in reverse flow in the cooler, are fed in.

Heavy fuel oil, hard coal, or petroleum coke are typically used as fuels. Because a large proportion of carbon compounds, particularly carbon monoxide, is a goal according to the invention for the exhaust gas produced in cement clinker production, in order to operate the thermal postcombustion plant autothermically, and because very extensive purifying of further pollutants from the exhaust gas takes place in the thermal postcombustion plant due to the high temperature of the combustion chamber, the relatively expensive fuels can be replaced according to the invention to a great extent by less expensive waste products, such as old tires, waste oil, plastic waste, or biogenic fuels such as sunflower seed shells, paper fiber residue, or animal meal.

In addition, according to the invention, waste products, particularly carbonaceous waste products such as fly ash, as well as crushed brick, for example, can be used in place of the typical raw materials such as limestone, quartz sand, and clay.

The raw mix is preferably calcinated in a calcinator by means of a secondary firing prior to burning in the rotary kiln. Tertiary air can be sued for the secondary firing, and can be preheated by flowing in the opposite direction through the cooler.

The waste products indicated are preferably used partially or exclusively as fuel for the secondary firing.

When calcinating in the calcinator, carbon dioxide is particularly driven out of the raw mix. About half of the total energy required for producing cement clinker is used to this end. The use of waste products as fuels for the secondary firing thus results in substantial cost savings.

In addition, the carbon dioxide released by calcinating at a high temperature is partially broken down into carbon monoxide at a high temperature, where by the carbon monoxide content in the exhaust air is further increased.

The exhaust gas exiting the rotary kiln or, if a calcinator is used, exiting the calcinator, is preferably subjected to selective non-catalytic reduction for decomposing NO by adding a nitrogen-hydrogen compound at a temperature of 800 to 1000° C., particularly 850 to 900° C., in an SNCR system. A significant portion of the NO in the exhaust gas can thereby be broken down by means of said SNCR system.

Because the exhaust gas is subjected to another thermal reburning according to the invention, the nitrogen-hydrogen compound for said selective non-catalytic reduction can be added at a hyperstoichiometric ratio (overage), because the excess nitrogen compound is then consumed in the subsequent regenerative thermal postcombustion plant.

The exhaust gas is preferably fed to a heat exchanger, such as a cyclone heat exchanger, after selective non-catalytic reduction of the nitrogen oxides, for preheating the raw mix. The exhaust gas exiting the heat exchanger is then preferably at least partially used for drying the ground raw materials from which the raw mix is produced, and then fed through a dust filter to the regenerative thermal postcombustion plant. The carbon monoxide content in the exhaust gas fed to the regenerative thermal postcombustion plant can thereby be 500 to 10000, preferably 1000-5000 mg/Nm$^3$, the $NO_x$ content 100 to 1000, preferably 200-500 mg/Nm$^3$.

Figure 2:
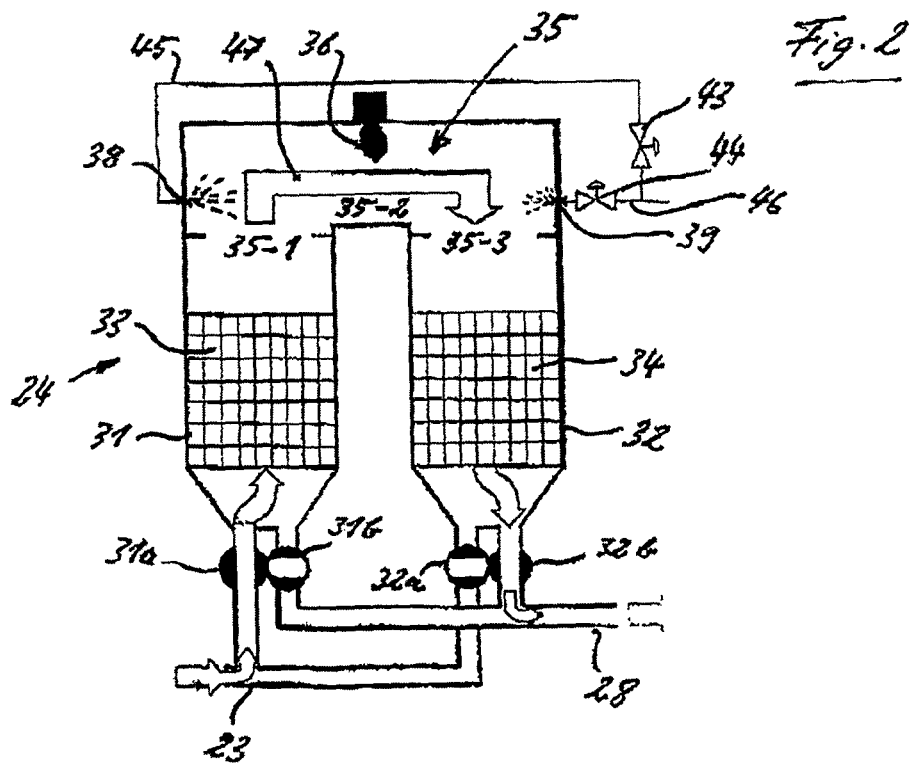
Figure 3:
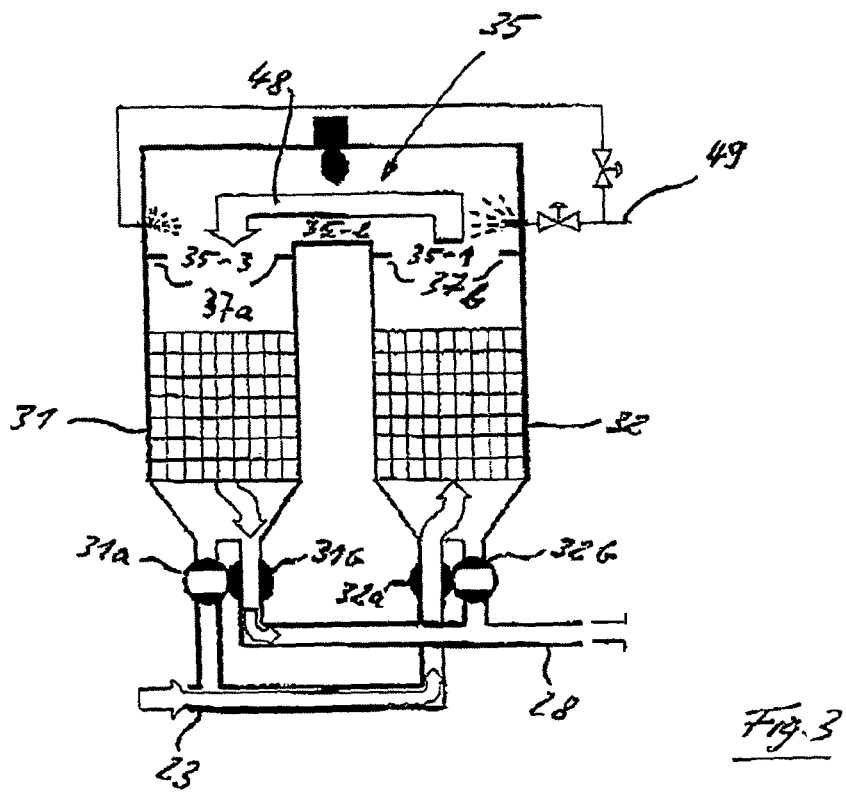

The invention is explained in greater detail below, using the attached drawing. It shows schematically:

FIG. 1 a system for producing cement clinker having an exhaust gas purifying system; and FIGS. 2 and 3 a cross section of an embodiment of the exhaust gas purifying system having two regenerators, wherein the exhaust gas to be purified is fed to one regenerator or the other.

According to FIG. 1, a rotary kiln 1 having a primary firing indicated by the arrow 2 is provided for producing cement clinker, by means of which the fuel and the combustion air are fed in. The secondary air heated in the cooler 3 is fed directly into the rotary kiln 1.

The exhaust gas of the rotary kiln 1 represented by the arrow 4 is fed via a line 5 of the secondary firing represented by the arrow 6 and fired by waste products, such as old tires and the like, as fuel, and by tertiary air preheated in the cooler 3 corresponding to the arrow 7 that is fed in via line 8.

A calcinator 9 is connected to the secondary firing 6, an SNCR device 11 being provided at the end thereof for selective non-catalytic reduction of $NO_x$ in the exhaust gas by means of a nitrogen-hydrogen compound, such as ammoniac.

The exhaust gas flows from the SNCR device 11 through the cyclone heat exchanger 12, in order to then be fed via a line 13 having a blower 14 to a device 15 for pulverizing and drying the raw materials from which the raw mix is produced.

The raw mix produced is fed to a cyclone 17 via the line 16 and from there into the heat exchanger 12 corresponding to the arrows 18a and 18b. Before the raw mix is fed via 18b, said raw mix can be homogenized and intermediately buffered. The exhaust gas exiting the cyclone 17 is fed back partially in circulation by means of the blower 19 via the line 21 of the device 15 for pulverizing and drying, and partially via the line 22 of the exhaust gas line 23 leading to the regenerative thermal postcombustion plant 24. The exhaust gas not used for pulverizing and drying is fed to the exhaust gas line via a cooling device 25.

The exhaust gas is dedusted in the exhaust gas line 23 by means of a filter 26 implemented as a fabric filter, for example, connected downstream of the blower 27. The dust that occurs is also fed to the heat exchanger tower 12 as raw mix via 18b. The exhaust gas in the exhaust gas line 23 comprises a carbon monoxide content of 0.2 to 1% by volume, for example, a nitrogen oxide content of 100 to 1000 mg/Nm$^3$, for example, and an oxygen content of 8 to 13% by volume, for example, wherein the remainder is substantially nitrogen, water, and carbon dioxide.

From the regenerative thermal postcombustion plant 23, the pure gas travels via the pure gas line 28 to the atmosphere by means of the blower 29.

The raw mix fed into the heat exchanger 12 corresponding to the arrow 18b is fed to the calcinator 9 in counterflow to the exhaust gas after the heat exchanger 12, and then to the rotary kiln 1 for burning, in order to be subsequently cooled down in the cooler 3.

According to FIGS. 2 and 3, the regenerative thermal postcombustion plant 24 comprises two regenerators 31, 32, the lowest end thereof each being able to be connected by means of shutoff devices 31a, 31b; 32a, 32b to the exhaust gas line 23 having the exhaust gas to be purified and the pure gas line 28.

The regenerators 31, 32 are filled with heat storage bodies 33, 34 and connected by means of a combustion chamber 35 that can have a burner 36.

The combustion chamber 35 consists of three zones: a first zone 35-1 above the heat storage bodies 33 of the regenerator 31, a second zone 35-2 between the two regenerators 31, 32, and a third zone 35-3 above the heat storage bodies 34 of the second regenerator 32. A constriction 37a, 37b for swirling the exhaust gas flow is thereby provided in the first zone 35-1 and the third zone 35-3 above the heat storage bodies 33, 34.

The second zone 35-2 of the combustion chamber 35 above the constriction 37a, 37b has jets 38, 39 at the beginning and at the end for feeding in an aqueous ammoniac solution 49 or a different nitrogen-hydrogen compound that is fed in via the lines 45, 46 having shutoff devices 43, 44.

The exhaust gas from the exhaust gas line 23 is fed alternately to the regenerators 31, 32, wherein in FIG. 2 the exhaust gas to be purified is fed to the previously heated regenerator 31, and the pure gas is drawn off via the regenerator 32, so that an exhaust gas flow corresponding to the arrow 47 arises in the combustion chamber 35.

To this end, the shutoff device 31a is opened and the shutoff device 31b is closed on the regenerator 31, while the shutoff device 32a of the regenerator 32 is closed and the shutoff device 32b is opened.

If an exhaust gas comprising a nitrogen-hydrogen compound and/or carbon monoxide is fed to the preheated heat storage bodies 33 of the regenerator 21, part of the nitrogen oxides in the exhaust gas is reduced in the first zone 35-1.

The nitrogen-hydrogen compound fed in at the beginning of the second zone 35-2 via the jet 38 causes thermal reduction of the nitrogen oxides in the second zone 35-2. Further portions of nitrogen oxides are reduced in the third zone 35-3 by injecting the nitrogen-hydrogen compound via the jet 39 at the end of the second zone 35-2. The amount of the nitrogen-hydrogen compound fed through the jets 38, 39 can be controlled by means of the shutoff devices 43, 44.

The temperature of the exhaust gas in the combustion chamber is maintained between 850 and 950° C. by burning the carbon monoxide and other carbon compounds in the exhaust gas to be purified in the combustion chamber 35.

If the heat storage bodies 34 in the regenerator 32 have been heated up by the hot pure gas, the regenerator 32 is connected to the exhaust gas line 23 by opening the shutoff device 32a and closing the shutoff device 32b, and the regenerator 31 is connected to the pure gas line 28 by closing the shutoff device 31a and opening the shutoff device 31b.

The flow direction of the exhaust gas is thus reversed, as represented by the arrow 48 in FIG. 3.

The following example, which has been performed using a system for cement clinker production according to FIG. 1 and an exhaust gas purifying system according to FIGS. 2 and 3, serves to further explain the invention.

EXAMPLE

A rotary kiln 1 for producing clinker is heated to a product temperature of 1450° C. by means of primary fuels, such as heavy oil, hard coal, or petroleum coke, and secondary fuels, such as old tires, waste oils, plastic waste, or biogenic fuels such as sunflower seed shells, paper fiber residues, and animal meal, and is fed with raw mix at 100 tonnes/h via the cyclone heat exchanger 12 and the calcinator 9. The raw material is heated in counterflow by the exhaust gas flow from the rotary kiln 1. Further feeding of primary and secondary fuels takes place in the calcinator 9. The clinker produced exits the rotary kiln 1 at 1200° C. and is used for preheating the air (secondary air, tertiary air) in the clinker cooler 3. The tertiary air is fed directly into the calcinator, bypassing the rotary kiln 1, and contributes to better combustion of the fuels fed there.

Directly before the lowest cyclone stage of the cyclone heat exchanger 12, selective non-catalytic reduction of the nitrogen oxides in the exhaust gas is performed by injecting aqueous ammoniac solution. The latter absorbs remaining volatile organic toxins and odorous substances from the raw mix while passing through the individual stages of the heat exchanger 12.

The exhaust gas exiting the heat exchanger 12 comprises the following composition:
25% carbon dioxide by volume
0.5% carbon monoxide by volume
3% oxygen by volume
400 mg/Nm$^3$ nitrogen oxides
20 ppm ammoniac
100 mg/Nm$^3$ organic carbon.

The exhaust gas is used for pulverizing and drying in the device 15 having coarse separation in the cyclone 17 connected downstream, and optionally for other drying units, such as for drying coal as a primary fuel, because there is no risk of explosion due to the low oxygen content thereof. The exhaust gas not needed for the drying processes is fed through the cooling device 25 and is purified using exhaust gas from the cyclone 17, and then dust is removed in the filter 26 implemented as a bag filter.

The exhaust gas then enters the regenerative thermal postcombustion plant 24 having ceramic heat storage bodies 33, 34 in the two regenerators 31, 32 at a volume of 200000 Nm$^3$/h via the line 23 by means of the blower 27. The heat storage bodies 33 and 34 heat the exhaust gas to a temperature of 950° C., at which the nitrogen oxides are reduced in the first zone of the combustion chamber 35-1 by means of the residual excess ammonia added to the exhaust gas by means of the SNCR system 11, and by means of a part of the carbon monoxide, forming nitrogen. The excess portion of carbon monoxide is oxidized to carbon dioxide by means of the oxygen present in the exhaust gas, and contributes to the autothermic operation of the postcombustion plant. The volatile organic pollutants and the odorous substances in the exhaust gas burn in the combustion chamber 35 to form carbon dioxide and water vapor.

The exhaust gas comprises, after leaving the first zone 35-1 of the combustion chamber 35, the following composition:
12% carbon dioxide by volume
0% carbon monoxide by volume
11% oxygen by volume
300 mg/Nm$^3$ nitrogen oxides
5 ppm ammoniac
0 mg/Nm$^3$ organic carbon.

At the beginning of the second zone 35-2 of the combustion chamber 35, in order to reduce further portions of nitrogen oxides still present, 130 kg/h of 25% ammoniac solution in water is injected in the flow direction 47. At the end of the second zone 35-2 of the combustion chamber 35, an additional 80 kg/h of 25% ammoniac solution in water is injected in the flow direction 47 in order to reduce further portions of nitrogen oxides still present.

At the end of the third zone 35-3 of the combustion chamber 35, the purified exhaust gas comprises the following composition:
12% carbon dioxide by volume
0% carbon monoxide by volume
11% oxygen by volume
150 mg/Nm$^3$ nitrogen oxides
5 ppm ammoniac
0 mg/Nm$^3$ organic carbon.

When the flow direction is reversed, corresponding to the arrow 48, the metering of the injected ammoniac solution is reversed. The flow direction is thereby reversed approximately every two to three minutes. The pure gas exits the postcombustion plant 24 at an average temperature of 160° C.

The invention claimed is:

1. A method for purifying exhaust gas of cement clinker production comprising:
   arranging a regenerative non-catalytic thermal post combustion plant to receive exhaust gas from cement clinker production wherein the cement clinker production is configured to generate exhaust gas comprising carbon monoxide and other carbon compounds, and nitrogen oxides; wherein the regenerative non-catalytic thermal post combustion plant comprises at least two regenerators (31, 32) filled with heat storage bodies (33, 34) and connected by a combustion chamber (35), wherein the combustion chamber (35) comprises:
       a first zone (35-1) associated with one of the heat storage bodies (33,34) of the at least one regenerator (31,32),
       a second zone (35-2) between the at least two regenerators (31,32), and
       a third zone (35-3) associated with the other one of the heat storage bodies (34,33) of the at least one further regenerator (32,31); and
   wherein the regenerative thermal post combustion plant is selectively configurable to allow exhaust gas to flow alternatively through the combustion chamber;
   wherein in one path, the exhaust gas flows through one of the heat storage bodies (33,34) of the at least one regenerator (31,32) to the first zone (35-1), to the second zone (35-2), to the third zone (35-3), to the other one of the heat storage bodies (34,33) of the at least one further regenerator (32,31), and then is drawn off, and wherein in the other path, the exhaust gas flows to the third zone (35-3), to the second zone (35-2), to the first zone (35-1), to the other one of the heat storage bodies (34,33) of the at least one further regenerator (32,31), and then is drawn off;
   wherein the second zone has jets (38,39) defining a beginning and an end of the second zone (35-2);
   wherein the first zone (35-1) extends from the heat storage body (33) to the jet (38) at beginning of second zone (35-2) and the third zone (35-3) extends from the jet (39) at the end of the second zone (35-2) to the heat storage body (34);
   the method further comprising:
   using a secondary fuel for producing the cement clinker, so that the exhaust gas comprises sufficient carbon monoxide content for reducing nitrogen oxides present in the first zone (35-1);
   alternating the flow of the exhaust gas between the regenerators (31,32) and the respective heat storage bodies (33,34) and through the combustion chamber (35) in a manner to heat the exhaust gas to a temperature of greater than 850° C. such that the carbon compounds present in the exhaust gas are oxidized in the combustion chamber (35); and
   feeding a first quantity of a nitrogen-hydrogen compound into the combustion chamber (35) at a beginning of the flow of the exhaust gases into second zone (35-2) and a second quantity of a nitrogen-hydrogen compound at an end of the flow of the exhaust gases from the second zone (35-2) from jets (38,39) depending upon a direction of the flow of the exhaust gas between the regenerators (31, 32);
       wherein the first quantity of the nitrogen-hydrogen compound fed in at the beginning of flow the exhaust gases into the second zone (35-2) is greater than the second quantity of the nitrogen-hydrogen compound fed in at the end of the flow of the exhaust from second zone (35-2);
       wherein the first quantity of the nitrogen-hydrogen compound is selected for reducing nitrogen oxides in the combustion chamber (35);
       wherein the second quantity of the nitrogen-hydrogen compound is selected for reducing remaining nitrogen oxides in the combustion chamber (35);
       wherein the second quantity of the nitrogen-hydrogen compound reduces nitrogen oxides present in the third zone (35-3);
       wherein essentially all of the carbon monoxide present in the exhaust gas is consumed in the first zone (35-1) in reducing the nitrogen oxides present in the exhaust gas;
       wherein essentially all of the nitrogen-hydrogen compounds are consumed in the third zone (35-3) in reducing remaining nitrogen oxides present in the exhaust gas; and
       wherein the reduction of nitrogen oxides in the combustion chamber occurs simultaneously with the oxidation of the carbon compounds present in the exhaust gas.

2. The method according to claim 1, characterized in that at least one of the first quantity and the second quantity of the nitrogen-hydrogen compound consists of one of the group of ammoniac, carbaminic acid, and urea.

3. The method according to claim 1, characterized in that the dwell time of the exhaust gas in the first zone (35-1) and in the third zone (35-3) of the combustion chamber (35) is 0.3 to 1 second for each case.

4. The method according to claim 1, characterized in that the dwell time of the exhaust gas in the second zone (35-2) of the combustion chamber (35) is 0.5 to 2 seconds.

5. The method according to claim 1, characterized in that a raw mix is calcinated by a secondary firing (6) before being burned by a primary firing (2) in a rotary kiln (1) of a cement plant before being fed to the regenerative non-catalytic thermal post combustion plant.

6. The method according to claim 5, characterized in that the nitrogen oxides formed mainly by the primary firing (2) of the rotary kiln (1) are partially broken down in the exhaust gas by selective non-catalytic reduction, with the addition of a nitrogen-hydrogen compound, before the exhaust gas is fed into a heat exchanger (12) for preheating the raw mix.

7. The method according to claim 6, characterized in that the nitrogen-hydrogen compound is fed in at a hyperstochiometric ratio for reducing the nitrogen oxides in the exhaust gas.

8. The method according to claim 6, characterized in that the exhaust gas exiting the heat exchanger (12) is used for pulverizing and drying the raw materials for the raw mix.

9. A device for performing the method according to claim 1, characterized in that the regenerative thermal postcombustion plant comprises a combustion chamber (35) divided by multiple constrictions (37a, 37b) and having the zones (35-1, 35-2, and 35-3).

10. The device for performing the method according to claim 1, characterized in that in place of two regenerators (31, 32) a plurality of parallel inlet and outlet regenerators are present.

11. The device for performing the method according to claim 1, characterized in that a further regenerator for purging raw gas is present.

12. The device for performing the method according claim 1, characterized in that at least one two-component jet or at least one ultrasonic atomizer, each having constant or pulsating pump pressure, is provided at least one of at the beginning of the second zone (35-2) and at the end of the second zone (35-2) of the combustion chamber (35) for distributing the nitrogen-hydrogen compound fed in as an aqueous solution.

13. The device for performing the method according to claim 5, characterized in that the secondary firing (6) is provided for the rotary kiln (1) downstream of the primary firing (2) in the flow direction of the exhaust gas, to which is connected a calcinator (9) followed by a heat exchanger (12) for prewarming the raw mix.

14. The device according to claim 13, characterized in that a separate air inlet line (8) is provided for the secondary firing (7).

15. The method of claim 1, characterized in that a concentration of nitrogen oxide in the exhaust gas prior to feeding to the regenerative non-catalytic thermal post combustion plant is in a range of about 100 mg/Nm$^3$ to about 1000 mg/Nm$^3$.

16. The method of claim 1, characterized in that a concentration of carbon monoxide in the exhaust gas prior to feeding to the regenerative non-catalytic thermal post combustion plant is in a range of about 500 mg/Nm$^3$ to about 10000 mg/Nm$^3$.

* * * * *